C. H. USHER.
PLANER STOP MECHANISM.
APPLICATION FILED FEB. 14, 1913.
1,088,852.
Patented Mar. 3, 1914.
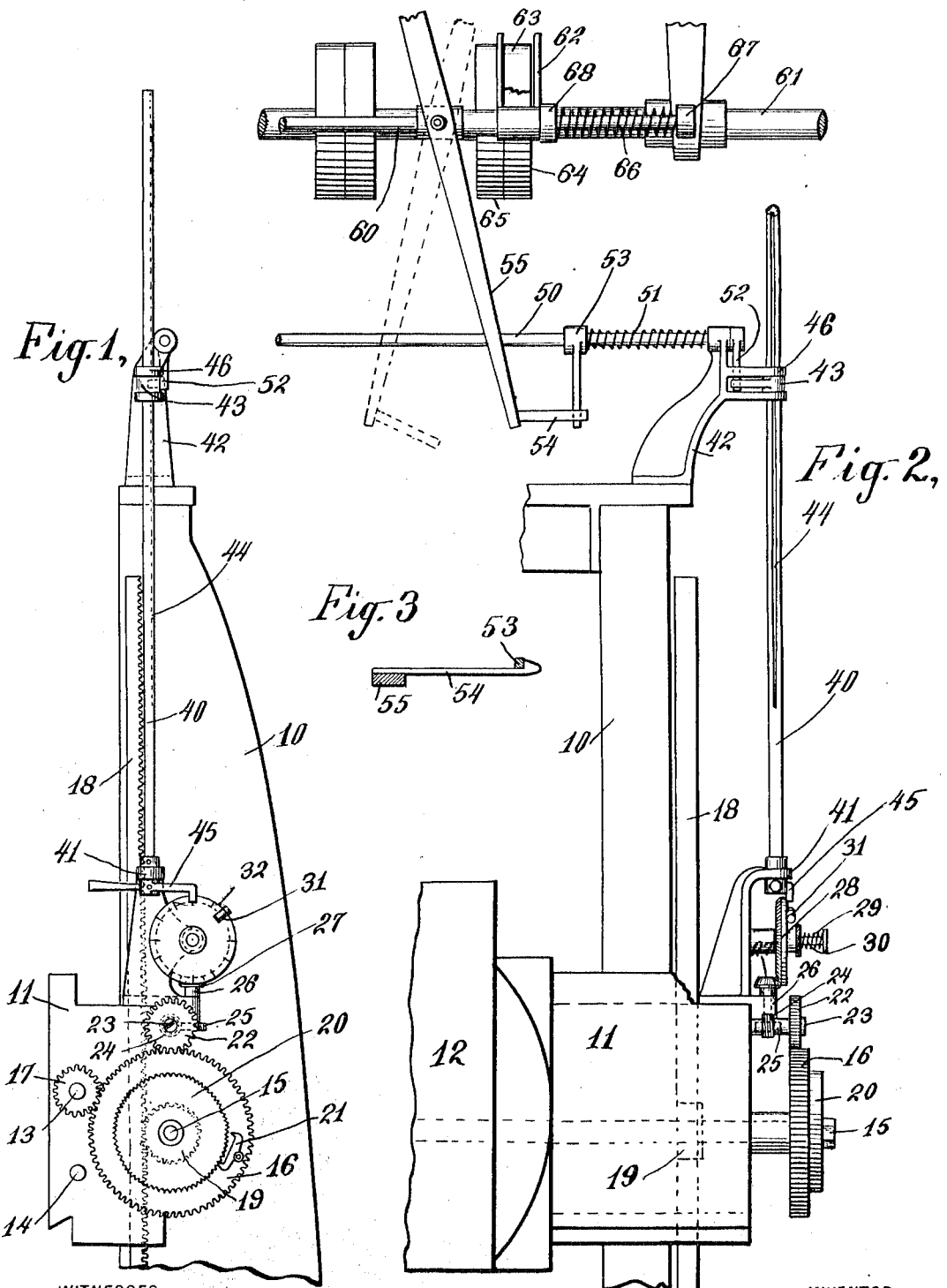
WITNESSES
G. R. Quimby
F. B. Graves
INVENTOR
Charles H. Usher
BY
E. W. Marshall
ATTORNEY

UNITED STATES PATENT OFFICE.

CHARLES H. USHER, OF CHICOPEE FALLS, MASSACHUSETTS, ASSIGNOR TO USHER AUTOMATIC STOP COMPANY, OF CHICOPEE FALLS, MASSACHUSETTS, A CORPORATION OF MASSACHUSETTS.

PLANER-STOP MECHANISM.

1,088,852.  Specification of Letters Patent.  Patented Mar. 3, 1914.

Application filed February 14, 1913. Serial No. 748,295.

*To all whom it may concern:*

Be it known that I, CHARLES H. USHER, a citizen of the United States, and a resident of Chicopee Falls, county of Hampden, State of Massachusetts, have invented certain new and useful Improvements in Planer-Stop Mechanism, of which the following is a specification, reference being had to the accompanying drawings, forming a part thereof.

My invention relates to stop motions for planers, and its object is to provide simple and effective means for automatically stopping the entire machine after predetermined feeding movements have been imparted to the cutting tool.

In Patent No. 1,027,575 issued May 28, 1912, on an application filed by me February 20, 1911, I have shown and described automatic means for stopping feeding movements of the cutting tool of a planer or similar machine tool. According to my present invention, I not only stop the feeding movements of the cutting tool, but also bring the entire machine to rest when the work has progressed to a predetermined point.

I will describe my invention in the following specification and point out the novel features thereof in appended claims.

Referring to the drawings Figure 1 is a side elevation of a portion of a planer or similar machine tool equipped with the automatic stop of my invention. Fig. 2 is a partial front elevation of the mechanism shown in Fig. 1 together with a portion of the transmission shaft from which the machine is driven. Fig. 3 is a detailed plan view of the shipper latch of Fig. 2, the shipper lever being shown in section.

Like characters of reference designate corresponding parts in all the figures.

10 designates a portion of the planer frame being a part of one of the vertical standards thereof. A vertically movable cross-rail 11 is mounted, as usual, to slide in vertical ways in the frame standards and a tool carriage saddle 12 is mounted to slide transversely in horizontal ways in the cross-rail. Vertical feed movements of the tool are effected by moving the cross-rail vertically in the frame while horizontal tool feed movements are effected by moving the saddle horizontally on the cross-rail, these two movements being accomplished in the usual manner by the rotation of two horizontal shafts 13 and 14 which are mounted in the cross rail 11. The intermediate mechanism between said shafts and the parts moved thereby is not shown in detail since it is well known and constitutes no part *per se* of my invention. A gear wheel 16 is rotatively supported on a feed driving shaft 15 and is arranged to mesh with a pinion 17 which is adapted to be mounted either on the horizontal feed shaft 13 or the vertical feed shaft 14. The driving shaft 15 is rotatively moved first in one direction and then in the other when the planer is in use, by means of a vertically reciprocatory rack bar 18. In accordance with the usual arrangement this rack bar is actuated by the planer bed when its movement is reversed. A pinion 19 secured to the shaft meshes with the rack bar. A ratchet wheel 20 is also secured to the shaft 15 and is adapted to coöperate with a reversible pawl 21, which is secured to the gear wheel 16. Since the gear wheel 16 is rotatively supported on the shaft 15 it is consequently only driven when the pawl 21 is in mesh with the teeth of the ratchet wheel 20.

A gear wheel 22 is mounted on a short shaft 23 and meshes with the gear wheel 16. The worm gear 24 may also be secured to the shaft 23 or otherwise operatively attached to the gear wheel 22, and meshes with a worm wheel 25 secured to a short vertical shaft 26. The shafts 23 and 26 are both mounted on the end of the cross-rail 11. Near the upper end of the shaft 26 is a beveled pinion 27 which normally meshes with a disk 28 having gear teeth on its back arranged for this purpose. The disk 28 is arranged to slide on a horizontal shaft 29 and its gear teeth are firmly held in mesh with the gear 27 by means of a spring 30. A cam projection 31 which is preferably provided with a roller is located on the outer face of the disk 28 and is adapted to engage a projection 45 as hereinafter pointed out. The disk 28 is provided with graduations 32 by which the cam projection 31 may be set to any desired position relative to the projection 45 upon which it acts. The projection 45 is secured to a shaft 40 near its lower end, the shaft being rotatively secured to a bracket 41 which forms a part of the cross-rail 11. It extends vertically upward through a bifurcated projection 46 of a bracket 42 which is attached to one of the standards 10 of the machine.

An arm 43 is located on the shaft 40 between the arms of the bifurcated projection 46 of bracket 42, the shaft being provided with a keyway 44 and the arm having a spline to prevent its turning on the shaft, without interfering with the vertical sliding movement of the shaft which occurs when the cross-rail is adjusted. Any suitable sliding connection may be established between the arm 43 and the shaft 40.

A relatively stationary shaft 50 is rotatively supported in a horizontal plane by brackets 42 (only one of which is shown) and is arranged to turn in opposition to a spring 51 when the shaft 40 is oscillated. An arm 52 secured to one end of the shaft 50 is actuated by the arm 43 and the aforesaid movement of the shaft 40 is then effected. A lever 53 is secured to the shaft 50 intermediate its ends and is arranged to engage a notched projection 54 which is attached to the usual hand lever 55 of a belt shipper. This shipper is intended to be representative of any suitable means for stopping the planer and as shown in Fig. 2 of the drawings comprises a sliding shaft 60 which is substantially parallel to a power transmission shaft 61 and is provided with a forked projection 62. The arms of this projection extend one on each side of a transmitting belt 63 which is arranged to run either on a fixed driving pulley 64 or a loose pulley 65. The position of the sliding shaft and of the belt is determined by the lever 55 except that a spring 66 is arranged on the shaft 60 between a guide bearing 67 and a collar 68 and tends to throw the belt onto the loose pulley and thus to stop the machine whenever the lever 55 is released by the action of the stop mechanism as hereinafter explained.

The operation of the device is as follows: Assume that the planer is disconnected from the driving shaft 61, the shipper being thrown to the left, as shown in dotted lines in Fig. 2. If the work is now set up on the planer bed in the usual manner and the tool is adjusted to the beginning of the work, the distance over which the tool must be fed determines the setting of the disk 28 which is graduated in inches and fractions thereof or in some other suitable manner with this in view. Having set the disk 28 the planer is started by throwing the lever 55 of the shipper to the right, in opposition to the spring 66 which tends to throw it to its "stop" position. The lever is held in its "operating" position by engagement of the latch 54 with the lever 53 as clearly shown in Fig. 3. The planer now operates in the usual manner, a reciprocatory motion being intermittently imparted to the rack bar 18 in the usual manner. This movement oscillates the shaft 15 and an oscillatory movement is therefore transmitted to the ratchet 20. A series of rotative adjustments in a constant direction are imparted to the feed driving gear wheel 16 through the pawl 21. One or the other of the feed shafts 13 and 14 is therefore intermittently turned to feed the tool in a well known manner. In accordance with the usual arrangement the rack bar is actuated only at the respective ends of the planer stroke and consequently the feed motion is imparted to the feed shafts when the tool is at the end of its stroke and out of engagement with the work.

The operator in charge of a machine equipped with my invention may leave the machine without danger for, when the work has progressed the predetermined distance, the projection 45 is engaged by the cam projection 31. The shaft 40 and the arm 43 are thus turned and by reason of the engagement of the arms 43 and 52, a rotative adjustment is also imparted to the shaft 50. This adjustment effects the release of the latch 54 and the spring 66 therefore throws the shipper to its "stop" position. The machine is thus immediately stopped.

The foregoing arrangement has the advantage of avoiding the waste of energy and unnecessary wear and tear on the planer which is entailed if the machine operates after the feed mechanism is stopped. Furthermore the stopping of the entire machine is much more noticeable than the stopping of the feed, the latter being relatively hard to detect. Consequently the attendant is readily aware that the work is finished and that the machine requires his attention, even if he is in charge of a large number of similarly equipped planers.

My invention is not limited to the specific arrangement illustrated and I desire that only such limitations be imposed as are indicated in the appended claims.

What I claim is:

1. The combination with a planer, a feed mechanism, a tool feed driving mechanism therefor, means arranged for stopping the planer and means automatically actuated in response to the tool feed driving mechanism after a predetermined movement thereof for operating the stopping means.

2. In combination with a planer, a feed mechanism, a tool feed driving mechanism directly associated therewith and operatively connected thereto, means arranged for stopping the planer, and means automatically actuated by the tool feed driving mechanism after a predetermined movement thereof for operating the stopping means.

3. In combination with a planer, a tool feed driving mechanism therefor, means arranged for stopping the planer when released, an adjustable cam disk operatively connected to said feed driving mechanism, and mechanism arranged to release the stopping means and automatically actuated by said cam disk after a predetermined movement of the feed driving mechanism and the disk whereby the planer is automatically stopped.

4. In combination with a planer, a tool feed driving mechanism therefor, horizontal and vertical feed shafts adapted to be operated by said tool feed driving mechanism, means arranged for stopping the planer when released, an adjustable cam disk operatively connected to said feed driving mechanism, and mechanism arranged to release the stopping means and automatically actuated by said cam disk after a predetermined movement of the feed driving mechanism and the disk, whereby the planer is automatically stopped.

5. In combination with a planer, a tool feed driving mechanism therefor comprising a rack and a gear wheel arranged to be rotated thereby, vertical and horizontal tool feed screws adapted to be operatively connected to said gear wheel, means for stopping the planer when released, an adjustable cam disk operatively connected to said gear wheel, and means dependent upon a predetermined movement of said cam disk for releasing the stopping means.

6. In combination with a planer, a tool feed driving mechanism therefor comprising a rack and gear wheel arranged to be rotated thereby, vertical and horizontal tool feed screws adapted to be operatively connected to said gear wheel, means for stopping the planer when released, an adjustable cam disk operatively connected to said gear wheel, a latch for releasing the stopping means, a spring tending to hold the latch set, and a slidably mounted shaft adapted to move the latch in opposition to the spring, said shaft being actuated by said cam disk, whereby the planer is automatically stopped after a predetermined movement of the feed driving mechanism and the disk.

In witness whereof, I have hereunto set my hand this 11th day of February in the year 1913.

CHARLES H. USHER.

Witnesses:
 FRED E. PATTERSON,
 FRANK D. HOWARD.